(12) United States Patent
Rueschhoff et al.

(10) Patent No.: US 7,559,440 B2
(45) Date of Patent: Jul. 14, 2009

(54) ANTI-CROSSOVER DISPENSING APPLICATOR

(75) Inventors: Kenneth J. Rueschhoff, Wildwood, MO (US); James P. McBroom, House Springs, MO (US)

(73) Assignee: Clayton Corporation, Fenton, MO (US)

( * ) Notice: Subject to any disclaimer, the term of this patent is extended or adjusted under 35 U.S.C. 154(b) by 553 days.

(21) Appl. No.: 11/221,409

(22) Filed: Sep. 7, 2005

(65) Prior Publication Data

US 2006/0076361 A1    Apr. 13, 2006

Related U.S. Application Data

(60) Provisional application No. 60/607,613, filed on Sep. 7, 2004.

(51) Int. Cl.
*B67D 5/00* (2006.01)
(52) U.S. Cl. .................... 222/145.5; 239/414
(58) Field of Classification Search ............ 222/94, 222/145.5–145.8, 137, 320, 321.1, 135, 570; 239/398, 400, 413, 414, 428, 432, 600
See application file for complete search history.

(56) References Cited

U.S. PATENT DOCUMENTS

| | | | | |
|---|---|---|---|---|
| 2,715,980 A * | 8/1955 | Frick | .......... | 222/183 |
| 3,303,970 A * | 2/1967 | Breslau et al. | ........... | 222/134 |
| 4,602,726 A * | 7/1986 | Goda | ............ | 222/321.6 |
| 4,607,764 A * | 8/1986 | Christine | ........... | 222/207 |
| 5,163,584 A | 11/1992 | Huber et al. | ........... | 222/1 |
| 5,180,082 A | 1/1993 | Cherfane | ........... | 222/145.2 |
| 5,462,204 A * | 10/1995 | Finn | ............ | 222/137 |
| 5,660,205 A * | 8/1997 | Epstein | ........... | 137/512.15 |
| 5,899,362 A * | 5/1999 | Moran | ............ | 222/136 |
| 6,158,624 A | 12/2000 | Grigg et al. | ........... | 222/145.6 |
| 6,305,578 B1 * | 10/2001 | Hildebrandt et al. | ........ | 222/135 |
| 6,527,203 B2 | 3/2003 | Hurray et al. | ........... | 239/413 |
| 7,243,682 B2 * | 7/2007 | Brandes | ........... | 137/853 |

* cited by examiner

*Primary Examiner*—Lien T Ngo
(74) *Attorney, Agent, or Firm*—Harness, Dickey & Pierce, P.L.C.

(57) ABSTRACT

A dispensing applicator for reactive components is provided that comprises a valve assembly having at least two flow paths being separate from each other such that at least a first component in a first flow path and at least a second component in a second flow path may not mix in the valve assembly, where there is a passage in each of the at least two flow paths that have one or more exit openings in a peripheral wall of each passage. The dispensing applicator further comprises a resilient flow control band surrounding the periphery of each passage and the one or more exit openings in the peripheral wall of the each passage to prevent cross-over flow of one component into the flow path of the other component. The resilient flow control bands may be positioned anywhere along the flow path leading to a mixing chamber for the reactive components.

14 Claims, 4 Drawing Sheets

ANTI-CROSSOVER DISPENSING APPLICATOR

CROSS-REFERENCE TO PRIOR APPLICATIONS

This application claim priority to U.S. Provisional Patent Application Ser. No. 60/607,613, filed Sep. 7, 2004, the disclosure of which is incorporated herein by reference.

FIELD OF THE INVENTION

This invention relates to a dispensing applicator which dispenses a settable resin material made from two or more components which react with each other to form the settable material, and more particularly to an applicator in which the flow of the resins through the applicator can be more easily contained.

BACKGROUND OF THE INVENTION

The resin dispensing technology is based on dispensing two or more liquid resin components, with a manually operated applicator which keeps the reactive components separate until they reach a mixing area. As is known, once the two or more components are combined in the mixing area, the components react with each other to produce a settable material such as a quickly curing urethane foam. Prior devices include numerous configurations for activation of the trigger, various valve concepts and different discharge characteristics. There are numerous variations of the types of foam dispensing applicators, however all such variations have drawbacks to a greater or lesser degree that have not been fully resolved.

One such problem is that the one of the reactive components may flow rearward into the flow passage of another component in the dispenser, where the passages may become clogged by the reacted component materials. This situation is commonly called "cross-over", and can cause clogging and failure of the dispensing applicator. One occurrence that can cause the potential for crossover is that of a blockage in the mixing area in the nozzle. When the nozzle of this type of applicator becomes blocked, there is a potential that one component may flow into the mixing area and have no where to flow except rearward into the flow path of another component. This undesirable situation may render the applicator useless, and result in a loss of time and resin component material.

SUMMARY OF THE INVENTION

In accordance with one aspect of the invention, an improved resin component dispensing applicator is provided that comprises a valve assembly having first and second flow paths being separate from each other, where within the first and second flow paths there are first and second passages respectively, which have one or more exit openings in a peripheral wall of each passage. The dispensing applicator further comprises a resilient flow control band that surrounds the periphery of the passage and covers the one or more exit openings in the peripheral wall, to prevent cross-over flow of one component into the flow path of another component. The dispensing applicator is generally configured for dispensing two components, but may be adapted for dispensing more than two components where a catalyst or other component may be employed.

In accordance with one aspect of the present invention, the first and second resilient flow control bands expand away from the one or more exit openings under pressure occurring from the normal flow direction towards the exit, to permit one-directional flow of components to a mixing chamber, and to prevent the crossover flow of one component from entering the flow path of the other component. The first and second resilient flow control bands may be positioned over an opening in a periphery element anywhere along the flow path of each component.

In accordance with another aspect of the invention, the unidirectional flow control bands are disposed over one or more exit openings leading to the mixing chamber in a nozzle of the dispensing applicator. The unidirectional flow control bands may be positioned over the exit openings of the dispensing applicator, or may be positioned over the inlet passages of a nozzle. The unidirectional flow control band in accordance with the principles of the present invention provides a simple, cost effective means for allowing one-directional flow control and preventing crossover flow problems.

BRIEF DESCRIPTION OF THE DRAWINGS

Corresponding reference numerals indicate corresponding parts throughout the several views of the drawings.

DETAILED DESCRIPTION OF THE INVENTION

Figure 1:
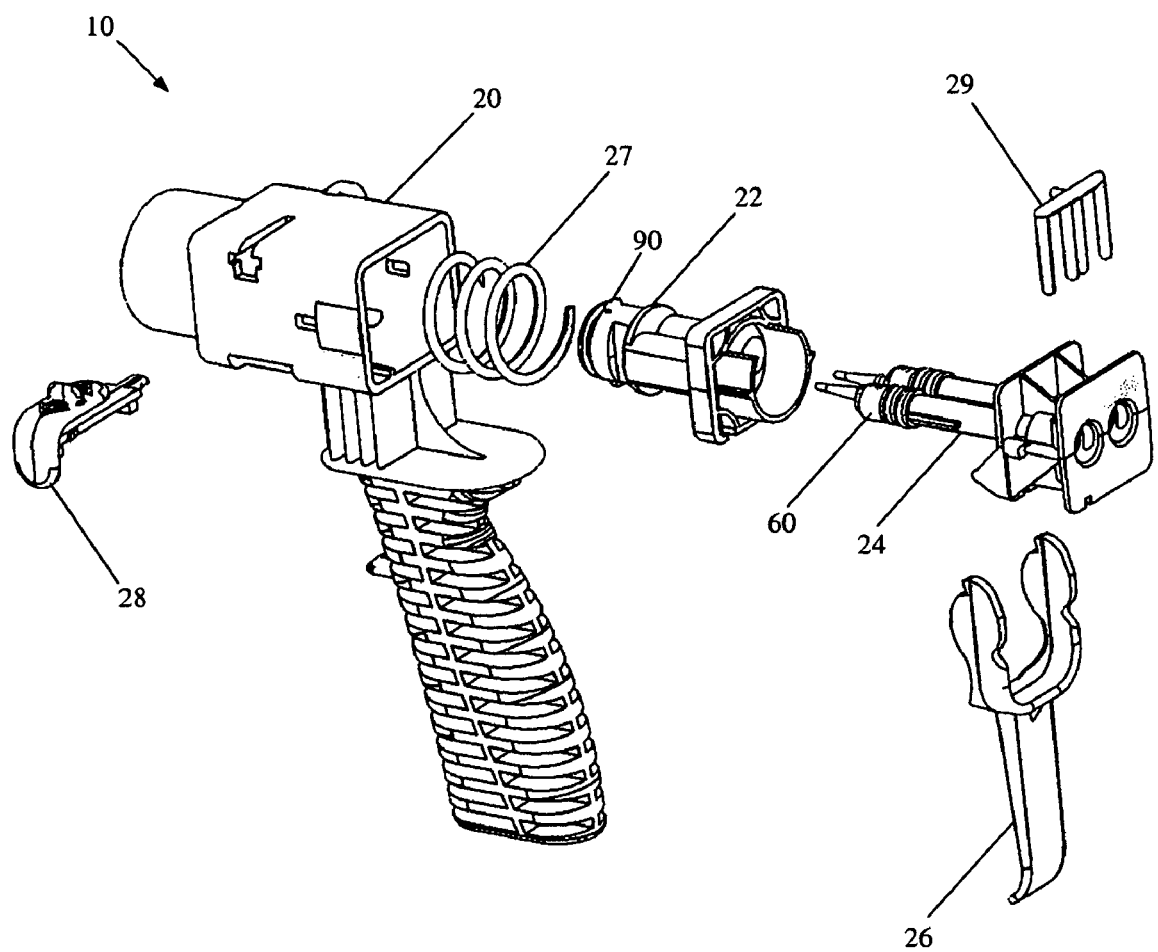
FIG. 1 is an exploded view of the components of a two-component dispensing applicator according to the principles of the present invention.

A reactive component dispensing applicator assembly in accordance with the principles of the present invention is indicated generally as 10 in an exploded view of the assembly shown in FIG. 1. In one embodiment, the dispensing applicator comprises a base 20 having a handle and an opening for receiving valve assembly components 22 and 24. The valve assembly components 22 and 24 provide separate flow paths for two resin component materials, and each valve assembly component comprises a first and second passage corresponding to the first and second flow paths. While the embodiment shown provides for flow control of two components, it should be understood that the dispensing applicator could also be configured for dispensing more than two components where a catalyst or other resin component may be employed. A trigger 26 provides for manually opening the valve assembly against the bias of a spring 27, which biases the valve assembly in a normally closed position. The dispensing applicator may also comprise components 28 and 29 for locking the trigger or locking the resin component supply lines in place. The dispensing applicator 10 also comprises a nozzle (not shown in FIG. 1) that attaches to the end of the valve component 22. The separate flow of the two resin components are received in a mixing chamber in the nozzle, through which the mixed components are dispensed. The dispensing applicator 10 may further comprise at least one unidirectional flow control band 60 in at least one of the flow paths to prevent the occurrence of crossover flow from one flow path to another, where the flow control band is disposed around a peripheral element having at least one opening.

Figure 2:
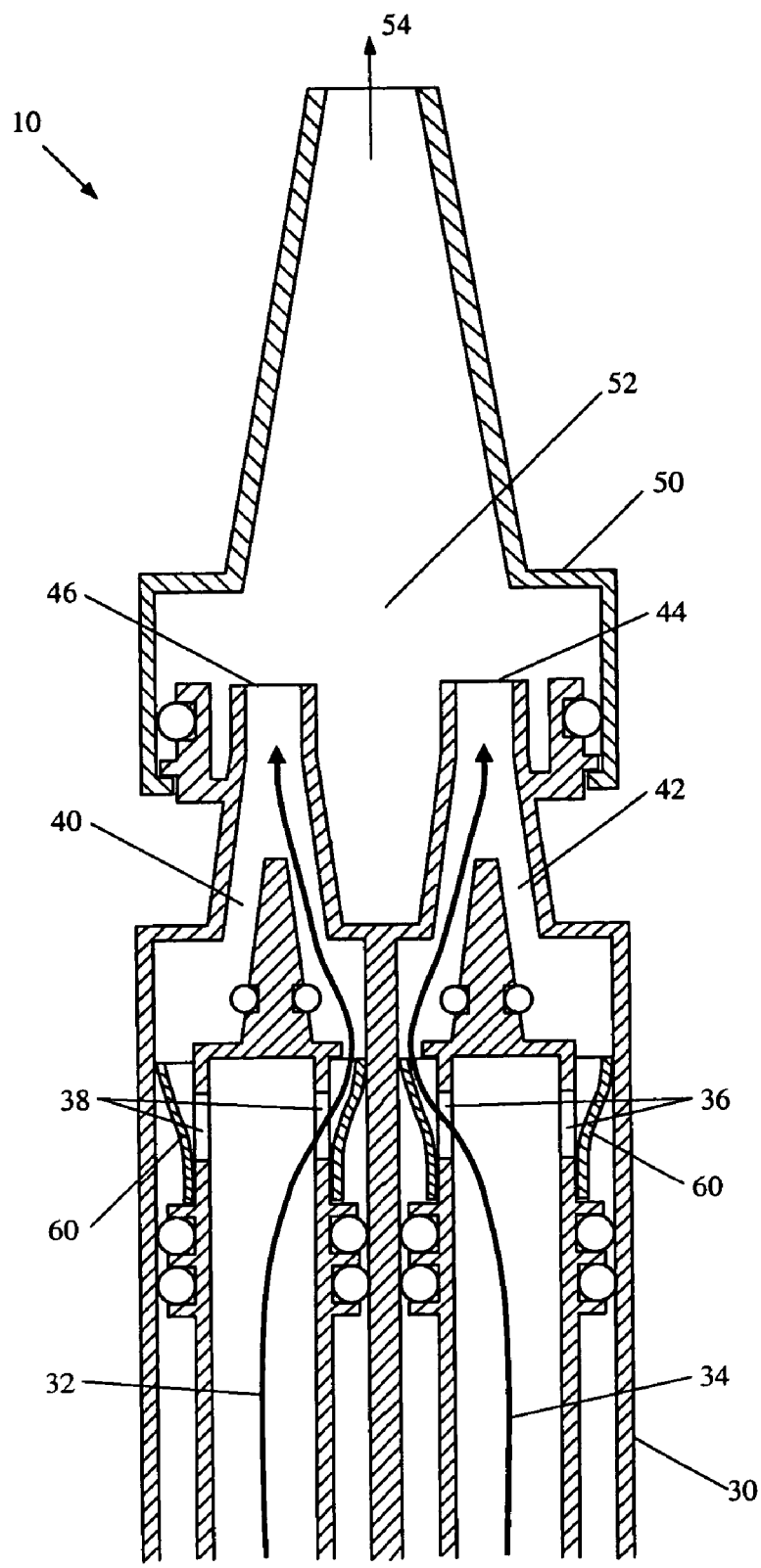
FIG. 2 is a cross-sectional view of an applicator valve assembly in one embodiment of the present invention comprising a flow control element.

Referring to FIG. 2, the separate flow paths 32 and 34 of the first and second resin components are shown in a cross-sectional view of a valve assembly 30 in one embodiment of the present invention. The first and second passages of the flow paths 32 and 34 each comprise one or more exit openings 36 and 38 within a peripheral wall of each passage, respectively. Surrounding or extending around the periphery of the passage and the one or more openings in the peripheral wall is at least one unidirectional flow control band 60 that covers the one or more exit openings to prevent the crossover flow of a component from one flow path back through an exit opening to the other component flow path. The unidirectional flow control bands 60 comprise a resilient band that is elastically biased against the one or more exit openings 36 and 38 in a normally closed position that does not permit the rearward flow of a component resin back through the exit openings 36 and 38. The resilient flow control bands 60 elastically expand away from the exit openings 36 and 38 under pressure resulting from the normal flow path directions 32 and 34. This elastic expansion permits the resin components to flow through the exit openings 36 and 38 past the resilient flow control bands 60 towards the exit. It should be noted that the flow control band may alternately comprise an elastic band that is generally in the shape of an o-ring, which may be positioned in an o-ring groove around the periphery of a passage and may alternatively cover an opening within the groove. The valve assembly generally comprises first and second valves 40 and 42 in the first and second flow paths, and first and second valve exits 44 and 46 that lead to a mixing chamber 52 of a nozzle 50. The resilient flow control bands 60 prevent the rearward displacement of component material in the valves 40 and 42 through the exit openings 36 and 38, such that one component under pressure cannot enter the valve exit and crossover into the flow path of the other component. The valve assembly 30 shown in FIG. 2 therefore provides for one-directional flow control of the components towards the valve exits 40 and 42, by using an inexpensive, easy to install resilient flow control band 60.

Figure 3:
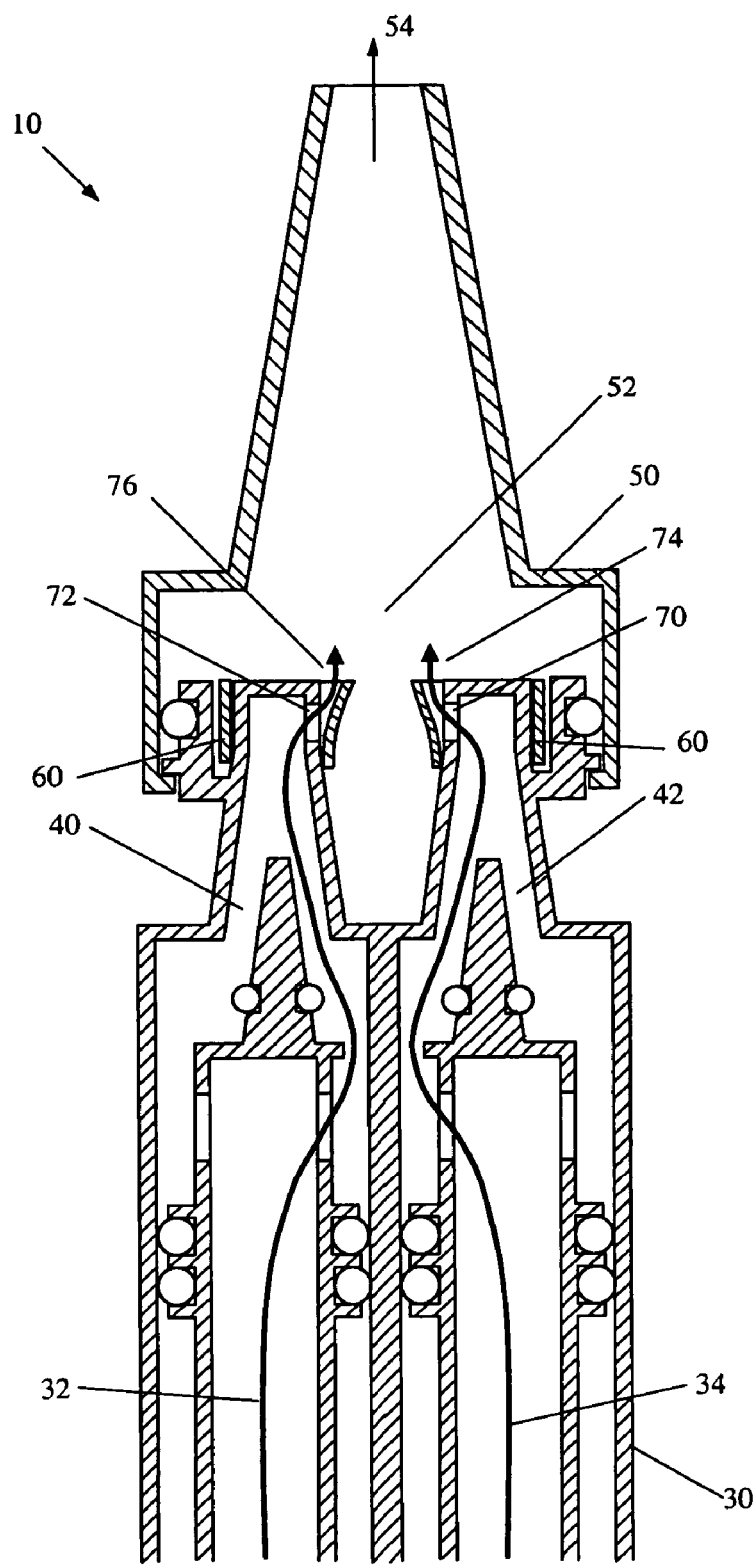
FIG. 3 is a cross-sectional view of another embodiment of the present invention comprising a flow control element.

Referring to FIG. 3, the separate flow paths 32 and 34 of the first and second resin components are shown in a cross-sectional view of a valve assembly 30 in another embodiment of the present invention. The first and second passages of the flow paths 32 and 34 each comprise one or more exit openings 70 and 72 within a peripheral wall of each of the passages that lead to a mixing chamber 52 in a nozzle 50. Surrounding or extending around the periphery of each passage and the one or more openings in the peripheral walls is a unidirectional flow control band 60 that covers openings to prevent a component from one flow path from flowing back through an exit opening to the other component flow path. The unidirectional flow control bands 60 comprise a resilient band that is elastically biased against the one or more exit openings 70 and 72 in a normally closed position that does not permit the rearward flow of a component resin back through the exit openings 70 and 72. The resilient flow control bands 60 elastically expand away from the exit openings 70 and 72 under pressure resulting from the normal flow path directions 32 and 34. This elastic expansion permits the resin components to flow through the exit openings 70 and 72 past the resilient flow control bands 60 towards the mixing chamber 52. The flow of first and second components is received in the mixing chamber 52 of the nozzle 50, through which the mixed components are dispensed at the nozzle exit 54. The resilient flow control bands 60 prevent a component under pressure in the mixing chamber from flowing rearward through the exit openings 70 and 72, such that flow one component cannot crossover and enter the flow path of the other component. The embodiment shown in FIG. 3 also provides for one-directional flow control of the components towards the valve exits 70 and 72, by using an inexpensive, easy to install resilient flow control band 60.

Figure 4:
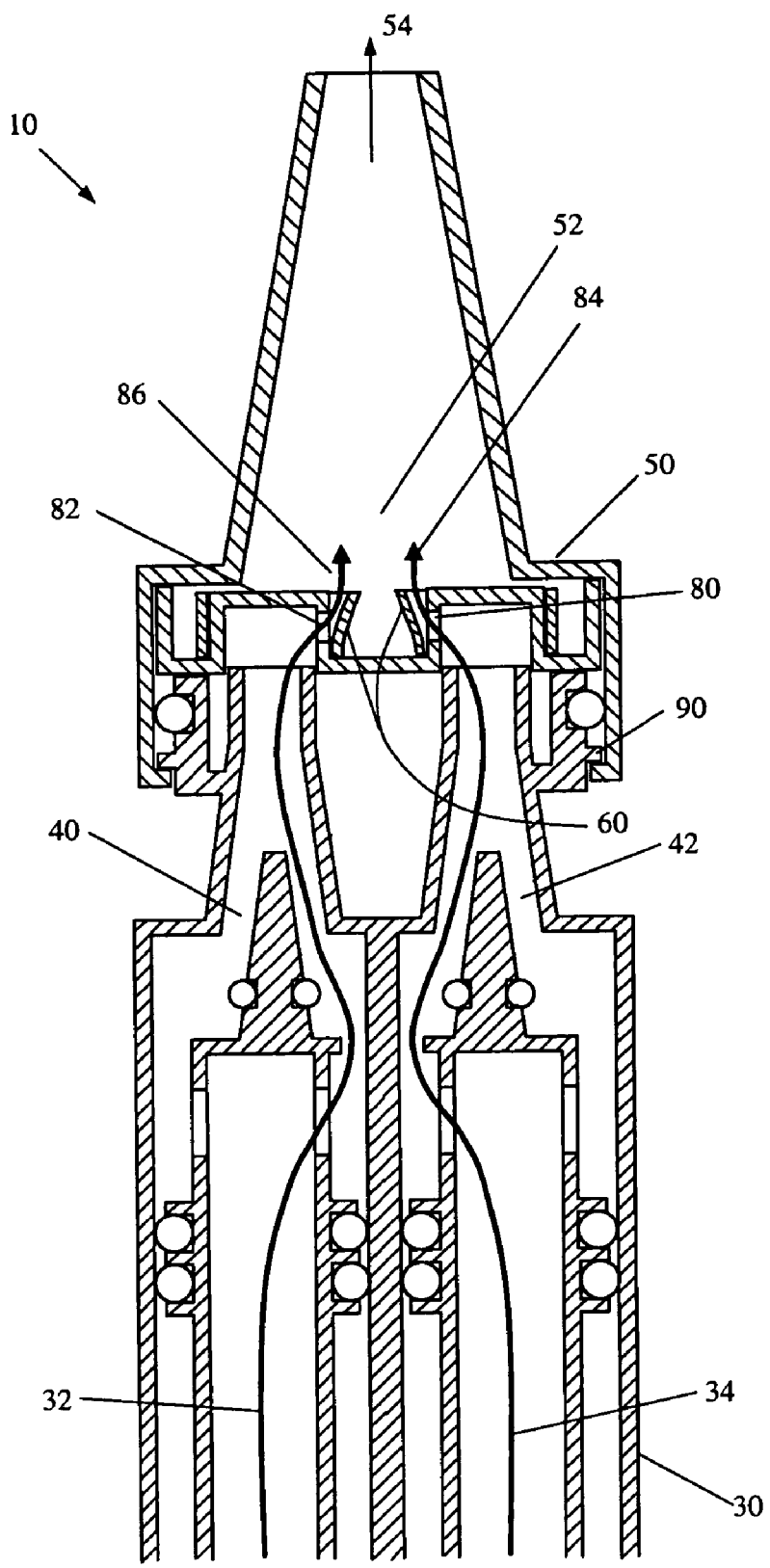
FIG. 4 is a cross-sectional view of yet another embodiment of the present invention comprising a flow control element.

Referring to FIG. 4, the separate flow paths 32 and 34 of the first and second resin components are shown in a cross-sectional view of a valve assembly 30 in yet another embodiment of the present invention. In this embodiment, the flow paths 32 and 34 each comprise one or more openings 80 and 82 within the peripheral walls of first and second nozzle inlet passages leading to a mixing chamber 52 in a nozzle 50. Surrounding or extending around the periphery of each nozzle inlet passage and the openings 80 and 82 in the peripheral walls is a unidirectional flow control band 60 that covers the openings to prevent a component from one flow path from flowing back through an opening to the other component flow path. The unidirectional flow control bands 60 comprise a resilient band that is elastically biased against the one or more openings 80 and 82 in a normally closed position that does not permit the rearward flow of a component resin back through the openings 80 and 82. The resilient flow control bands 60 elastically expand away from the openings 80 and 82 under pressure resulting from the normal flow path directions 32 and 34. This elastic expansion permits the resin components to flow through the openings 80 and 82 past the resilient flow control bands 60 towards the mixing chamber 52, and prevents a component under pressure in the mixing chamber 52 from flowing rearward through the openings 80 and 82, such that flow one component cannot crossover and enter the flow path of the other component. The flow of first and second components is received in the mixing chamber 52 of the nozzle 50, through which the mixed components are dispensed at the nozzle exit 54. The embodiment shown in FIG. 4 thus also provides for one-directional flow control of the components towards the openings 80 and 82 in the nozzle inlet passages, by using an inexpensive, easy to install resilient flow control band 60. The nozzle 50 and flow control bands 60 of this embodiment, unlike the dispensing applicator, are of minimal cost and can be easily replaced. It would therefore be desirable to include the one-directional flow control bands of the present invention on such a disposable, inexpensive component. Such a nozzle component may also be configured to be connected specifically to the dispensing applicator of the present invention, which includes one or more tabs 90 for uniquely securing the inventive nozzle to a dispensing applicator.

In some other embodiments, the unidirectional flow control bands 60 may also be positioned around the periphery of the inlet passages leading into the valve assembly, where the resin component supply lines connect to the inlets of the valve assembly. In such embodiments, the inlet passages to the valve assembly are much like the inlet passages to the nozzle 50 described above. Such inlet passages to the valve assembly may comprise one or more openings through a peripheral wall of the inlet passage that may be covered by the unidirectional flow control bands 60 as taught in the above disclosed embodiments. Accordingly, the unidirectional flow control bands 60 may be employed anywhere along the flow path leading up to the mixing chamber.

The advantages of the above described embodiment and improvements should be readily apparent to one skilled in the art, as to enabling one-directional flow control of a two-component dispensing applicator. Additional design considerations such as the design of an applicator adapted to uniquely receive a one-directional flow control nozzle, may be incorporated without departing from the spirit and scope of the invention. Accordingly, it is not intended that the invention be limited by the particular embodiment or form described above, but by the appended claims.

What is claimed is:

1. A nozzle for a two-component dispensing applicator, the nozzle comprising:
    a nozzle having a tab for removably securing the nozzle to an applicator;
    a disposable component received within an interior portion of the nozzle, the disposable component having first and second inlet passages, each passage having an annular-shaped peripheral side wall and at least one exit opening in the annular-shaped peripheral side wall of the passage leading to a mixing chamber in the nozzle; and
    first and second one-directional flow control bands disposed around the first and second inlet passages respectively, the first one-directional flow control band extending around the annular-shaped peripheral side wall in the first inlet passage and the second one-directional flow control band extending around the annular-shaped peripheral side wall in the second inlet passage, each flow control band covering the at least one exit opening in the annular-shaped peripheral side wall of each of the inlet passages to prevent cross-over flow that could permit mixing of the two components in either of the flow paths leading up to the inlet passages and the mixing chamber of the nozzle, wherein said nozzle, disposable component and flow control band are external to and removable from the dispensing applicator to permit replacement thereof.

2. The nozzle according to claim 1 wherein the one-directional flow control band comprises a resilient band that is biased against the at least one exit opening in a normally closed position that does not permit the flow of a component back through the at least one exit opening from the mixing chamber.

3. The nozzle according to claim 2 wherein the nozzle is adapted to uniquely connect to one or more tabs on the dispensing applicator.

4. A dispensing applicator for reactive components comprising:
    a valve assembly having at least two flow paths being separate from each other such that at least a first component in a first flow path and at least a second component in a second flow path may not mix in the valve assembly;
    a replaceable nozzle that is removably secured to the valve assembly by a tab on the nozzle;
    a disposable component received within an interior portion of the nozzle, the disposable component having first and second inlet passages respectively disposed in each of the at least first and second flow paths, the first inlet passage having an annular-shaped peripheral side wall and at least one exit opening in the annular-shaped peripheral side wall, and the second inlet passage having an annular-shaped peripheral side wall and at least one exit opening in the annular-shaped peripheral side wall; and
    first and second resilient flow control bands disposed around the first and second inlet passages respectively, the first resilient flow control band extending around the annular-shaped peripheral side wall in the first inlet passage and the second resilient flow control band extending around the annular-shaped peripheral side wall in the second inlet passage, wherein the first and second resilient flow control bands extend over the one or more exit openings in the peripheral side wall of the each passage to prevent cross-over flow of one component into the flow path of another component,
    wherein said nozzle, disposable component and flow control bands are external to and removable from the dispensing applicator to permit replacement thereof.

5. The dispensing applicator according to claim 4 wherein the resilient flow control bands are biased against the one or more exit openings in a normally closed position that restricts the rearward flow of a component back through the exit opening.

6. The dispensing applicator according to claim 5 wherein the resilient flow control bands expand away from the one or more exit openings under normal flow direction pressure, to permit one directional fluid flow to the exit.

7. The dispensing applicator according to claim 6 wherein the first and second passages and resilient flow control bands are included within the valve assembly.

8. The dispensing applicator according to claim 7 wherein the one or more exit openings in the first and second passages lead to a mixing chamber in a nozzle of the dispensing applicator, and the resilient flow control bands only permit one directional flow of components into the mixing chamber.

9. The dispensing applicator according to claim 4, wherein the resilient band has a generally o-ring shape that is configured to cover one or more openings in the peripheral side wall of a passage.

10. A dispensing system which dispenses a product of the mixing of at least first and second components that pass through separate flow paths to a mixing chamber in which the components are mixed, the dispensing system comprising:
    a removable nozzle defining a mixing chamber;
    first and second flow paths leading to the mixing chamber;
    first and second valves disposed in the first and second flow paths for controlling the flow of at least first and second component;
    the first valve comprising a first valve member having a passage therethrough opening to a port in the first valve member; and a first valve cup having an annular-shaped peripheral side wall surrounding at least the portion of the first valve member including the port, and a first valve opening in the annular-shaped peripheral side wall communicating with the mixing chamber, the first valve member and the valve cup being relatively movable between a closed position in which the first valve member closes the first valve opening in the annular-shaped peripheral side wall of the first cup member, and an open position in which the first valve member is spaced from the valve opening in the first valve cup;
    the second valve comprising a second valve member having a passage therethrough opening to a port in the second valve member; and a second valve cup having an annular-shaped peripheral side wall surrounding at least the portion of the second valve member including the port, and a second valve opening in the annular-shaped peripheral side wall communicating with the mixing chamber, the second valve member and the valve cup being relatively movable between a closed position in which the second valve member closes the second valve opening in the annular-shaped peripheral side wall of the second cup member, and an open position in which the second valve member is spaced from the valve opening in the second valve cup
    a first one-directional flow band that is disposed around an exterior portion of the annular-shaped peripheral side wall of the first valve cup and resiliently covers the first valve opening in the annular-shaped peripheral side wall, such that the first one-directional flow band is external to and removable from the first valve upon removal of the nozzle; and a second one-directional flow band that is disposed around an exterior portion of the annular-shaped peripheral side wall of the second valve cup and resiliently covers the second valve opening in the annular-shaped peripheral side wall, such that the second one-directional flow band is external to and removable from the second valve upon removal of the nozzle;

whereby the first and second one-directional flow bands prevent cross-over flow to prevent back flow that could permit mixing of the two components outside of the mixing chamber.

11. The dispensing system according to claim 10 wherein the one-directional flow bands are biased against the first and second valve openings in a normally closed position that restricts the rearward flow of a component back through the exit opening.

12. The dispensing system according to claim 10 wherein the one-directional flow bands expand away from the first and second valve openings under normal flow direction pressure, to permit one directional fluid flow to the exit.

13. The dispensing system according to claim 10 wherein the first and second valve openings lead to a mixing chamber in a nozzle of the dispensing system, and the one-directional flow bands only permit one directional flow of components from the first and second valves into the mixing chamber.

14. The dispensing system according to claim 10 wherein each of the first and second valve cups have a recessed grove for receiving the one-directional flow band.

* * * * *